United States Patent
Khitun

(10) Patent No.: US 12,424,867 B2
(45) Date of Patent: Sep. 23, 2025

(54) METHOD AND DEVICE FOR INCREASING ENERGY DENSITY

(71) Applicant: The Regents of the University of California, Oakland, CA (US)

(72) Inventor: Aleksandr Khitun, Long Beach, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 576 days.

(21) Appl. No.: 17/799,537

(22) PCT Filed: Feb. 11, 2021

(86) PCT No.: PCT/US2021/017668
§ 371 (c)(1),
(2) Date: Aug. 12, 2022

(87) PCT Pub. No.: WO2021/163332
PCT Pub. Date: Aug. 19, 2021

(65) Prior Publication Data
US 2023/0093902 A1    Mar. 30, 2023

Related U.S. Application Data

(60) Provisional application No. 62/976,061, filed on Feb. 13, 2020.

(51) Int. Cl.
*H02J 7/00*    (2006.01)
*H01G 4/40*    (2006.01)
*H02J 7/34*    (2006.01)

(52) U.S. Cl.
CPC .............. *H02J 7/345* (2013.01); *H01G 4/40* (2013.01); *H02J 2207/50* (2020.01)

(58) Field of Classification Search
CPC ......... H02J 7/345; H02J 2207/50; H01G 4/40
USPC ....................................................... 320/166
See application file for complete search history.

(56) References Cited

U.S. PATENT DOCUMENTS

2006/0238034 A1    10/2006    Rose
2007/0293916 A1*   12/2007    Peterchev ............... A61N 2/02
                                                        607/61
2009/0201620 A1*    8/2009    Gray ...................... B60L 50/00
                                                        361/159

(Continued)

FOREIGN PATENT DOCUMENTS

JP        2018182283        11/2018
WO    WO-2009099342 A2 *    8/2009   ........... H02M 3/158
WO    WO-2013048465 A1 *    4/2013   ........... H01G 11/14

OTHER PUBLICATIONS

Bloom et al., German Patent Document No. DE-102013219528-A1, published Apr. 2, 2015, 3 pages including abstract and claim. (Year: 2015)*

(Continued)

*Primary Examiner* — Phallaka Kik
(74) *Attorney, Agent, or Firm* — SCHWEGMAN LUNDBERG & WOESSNER, P.A.

(57) ABSTRACT

An energy storage device and associated methods are shown. Example energy storage devices include a capacitor and an adjacent inductor circuit to provide a compensating induced voltage to the capacitor.

6 Claims, 3 Drawing Sheets

(56) References Cited

U.S. PATENT DOCUMENTS

| | | | | |
|---|---|---|---|---|
| 2012/0108883 | A1* | 5/2012 | Peterchev | A61N 2/02 600/14 |
| 2013/0335091 | A1* | 12/2013 | Morris | G01V 3/081 324/333 |
| 2015/0091520 | A1* | 4/2015 | Blum | B60L 53/122 320/108 |
| 2017/0371470 | A1 | 12/2017 | Nathan et al. | |
| 2018/0137984 | A1* | 5/2018 | Furuta | H01G 4/32 |
| 2019/0103229 | A1 | 4/2019 | Gardner et al. | |

OTHER PUBLICATIONS

International Application Serial No. PCT/US2021/017668, International Search Report mailed Apr. 28, 2021, 2 pgs.

International Application Serial No. PCT/US2021/017668, Written Opinion mailed Apr. 28, 2021, 4 pgs.

Zhang, et al., "Six-Plate Capacitive Coupler to Reduce Electric Field Emission in Large Air-Gap Capacitive Power Transfer", IEEE, [Online]. Retrieved from the Internet: <https://ieeexplore.ieee.org/stamp/stamp.jsp?tp=&arnumber=7839952>, (Jan. 2018).

"International Application Serial No. PCT US2021 017668, International Preliminary Report on Patentability mailed Aug. 25, 2022", 6 pgs.

"European Application Serial No. 21753723.2, Communication Pursuant to Article 94(3) EPC mailed Mar. 14, 2024", 9 pgs.

"Electromagnetism—Discharging a capacitor quicker, sing an exterior time varying magnetic field?—Electrical Engineering Stack Exchange", [Online]. Retrieved from the Internet: URL: https: electronics.stackexchange.com questions 390716 discharging-acapacitor-quicker-using-an-exterior-time-varying-magnetic-field, (Aug. 12, 2018).

"Japanese Application Serial No. 2022-548825, Notification of Reasons for Rejection mailed Jan. 21, 2025", W English Translation, 16 pgs.

"Japanese Application Serial No. 2022-548825, Notification of Reasons for Refusal mailed Jul. 15, 2025", w English Translation, 2 pgs.

* cited by examiner

US 12,424,867 B2

METHOD AND DEVICE FOR INCREASING ENERGY DENSITY

CLAIM OF PRIORITY

This application is a U.S. National Stage Filing under 35 U.S.C. 371 from International Application No. PCT/US2021/017668, filed on Feb. 11, 2021, and published as WO 2021/163332 A1 on Aug. 19, 2021, which claims the benefit of priority to U.S. Provisional Patent Application Ser. No. 62/976,061, filed on Feb. 13, 2020, each of which is incorporated by reference herein in its entirety.

TECHNICAL FIELD

Embodiments described herein generally relate to energy storage devices and associated methods. Specific examples include, but are not limited to capacitor devices.

BACKGROUND

Electric capacitors are among the promising devices offering a convenient way for energy storage and release. Recently, most of research has been focused on the supercapacitor. Improved energy storage devices and methods are desired. One metric of improvement includes increased energy storage density.

DESCRIPTION OF EMBODIMENTS

Figure 1:
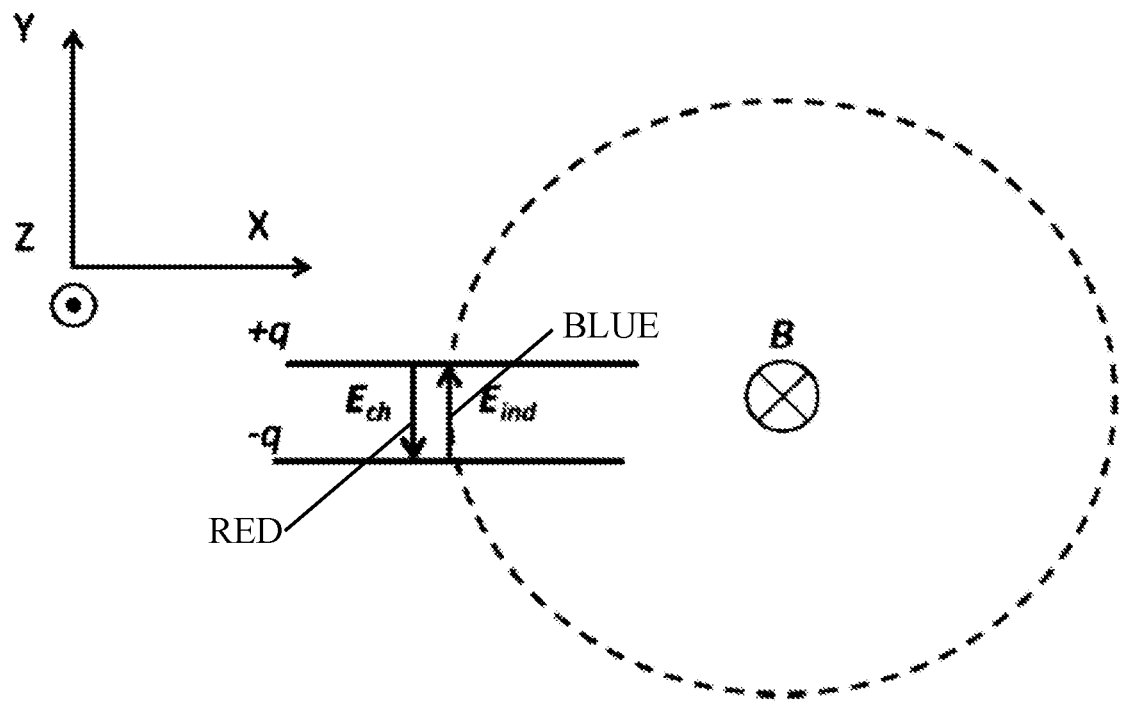
FIG. 1: Schematics showing a parallel-plate capacitor in magnetic field B. The red and the blue arrows show the direction of the charge induced $\vec{E}_{ch}$ and the inductive electric fields $\vec{E}_{ind}$. The direction of the inductive field is chosen to compensate the charge-induced field.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

There is a big impetus in the development of energy storage devices which is stimulated by the urgent need in clean (pollution free) energy sources. It would of great benefit to the society to have a clean battery with the energy density (i.e., energy per volume) [J/m³] exceeding the one of gasoline 34.2 MJ/L. Electric capacitors are among the promising devices offering a convenient way for energy storage and release. Recently, the most of research has been focused on the supercapacitor. Here, we want to reconsider sonic basic derivations on the energy stored in classical capacitors (i.e. a parallel plate capacitor) and offer a novel approach to energy storage enhancement. It is a well-known that the maximum amount of energy stored in an electric capacitor is limited by the electric breakdown. The breakdown occurs as the strength of the electric field exceeds some critical value $E_b$. It implies a limit on the maximum potential difference between the plates of the capacitor: $V_{max}=d \cdot E_b$, and the maximum charge on the plate $q_{max}=C \cdot V_b$, where d is the separation distance between the plates, C is the capacitance. The total energy stored in the capacitor is usually calculated as follows:

$$W_{max} = \int_0^{q_{max}} V dq = \int_0^{q_{max}} \frac{q}{c} dq = \frac{q_{max}^2}{2C} = \frac{1}{2} C V_b^2. \quad (1)$$

We want to emphasize that this formula is derived under the assumption that the electric field (voltage difference between the plates) is due to the presence of electric charge. In this disclosure, we detail a method of increasing the amount of charge in electric capacitors by implementing a compensational inductive voltage. This approach makes it possible to overcome the limit of Eq. (1) and increase the energy density of capacitors.

Examples described in the present disclosure offer more efficient energy storage devices, which are capable to store more energy than the existing devices. This disclosure discusses the general approach to energy enhancement in capacitors, discusses practical challenges, and describe possible practical schemes (e.g. circuits) for implementation.

There are two origins of an electric field. (i) An electric field can be produced by electric charges. According to Gauss's law for electric field, the strength of the electric field $\vec{E}_{ch}$ produced by electric charges can be found as follows:

$$\nabla \cdot \vec{E}_{ch} = \frac{\rho}{\varepsilon_0} \quad (2)$$

where $\rho$ is the charge density, $\varepsilon_0$ is the permittivity of free space.

(ii) An electric field can be also produced by the time varying magnetic field $\vec{E}_{mag}$. According to Faraday's law of induction, the strength of the electric field produced by the time varying magnetic field is given by:

$$\nabla \cdot \vec{E}_{ind} = \frac{-\partial \vec{B}}{dt} \quad (3)$$

where B is the magnetic flux density, t is the time. The total (effective) electric field $\vec{E}_{eff}$ is a superposition of two:

$$\vec{E}_{eff} = \vec{E}_{ch} + \vec{E}_{ind}. \quad (4)$$

Taking into account the inductive electric field, the equation for energy stored in a capacitor (i.e., Eq. (1)) should be rewritten as follows:

$$W_{max} = \int_0^{q_{max}} (d \cdot E_{eff}) dq \quad (5)$$

The introduction of the inductive electric field into consideration makes it possible to overcome the limit of Eq. (1) for the energy stored in the capacitor.

We propose the Compensation method where the inductive voltage produced by the time varying magnetic field compensates the electric field produced by electric charges to keep the resulting effective electric field below the breakdown. It makes it possible to charge the capacitor to a larger amount of charge compared to the regular case without the compensating electric field. Next, we propose the idea and describe possible solutions to apply the compensational inductive voltage to maximize the energy stored in electromagnetic oscillators. We also propose to exploit the inductive electric field to keep the maximum possible voltage difference between the plates during the discharging. Overall, the proposed approach offers a fundamental advantage over the existing practices in terms of energy stored per volume in electric capacitors.

As an example, let us consider a capacitor in a magnetic field as shown in FIG. 1. It is a parallel plate capacitor with two conducting plates of area A oriented in X-Z plate. The separation distance between the plates is d. For simplicity, we consider the volume between the plates filled with vacuum. Each plate carries a charge of magnitude q. There is a source of magnetic which produces field B directed along/opposite the Z axis. The magnetic field is controlled by the outer circuit. We consider three states of capacitor operation including charging, charge storage, and discharging.

Charging: We start to charge the capacitor at the constant magnetic field $\partial B/\partial t = 0$ ($\vec{E}_{ind}=0$). As the electric field produced by charges $E_{ch}$ approaches the breakdown value Eb, the source of magnetic field is turned on to provide the inductive electric field Eind in the direction opposite to $E_{ch}$:

$$E_{ch} - E_{ind} \leq E_b \quad (6)$$

The charging is continued till some charge $q_{max}=d \cdot C \cdot E_{ch\text{-}max}$ is stored on the plates.

Storage: In order to store the accumulated amount of charge, the inductive electric field should remain constant to keep the effective electric field below the breakdown Eq. (6).

Figure 2:
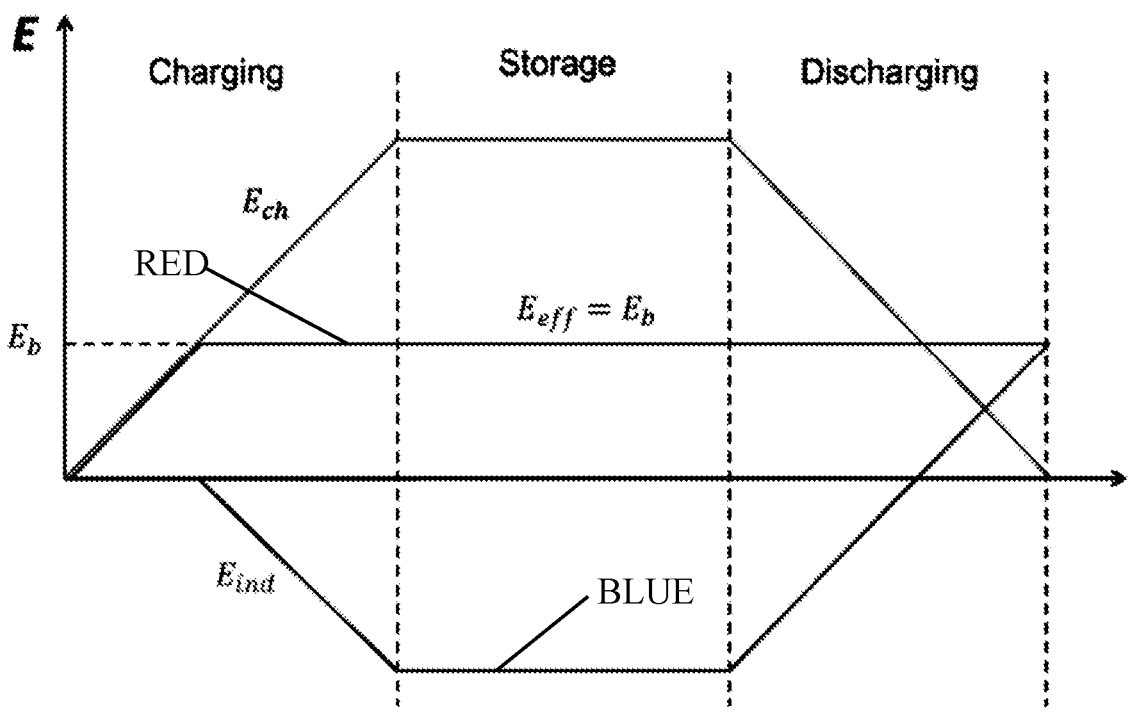
FIG. 2: Illustration of the principle of operation. The charging of the capacitor starts at zero inductive electric field $E_{ind}$. As the electric field produced by charges $E_{ch}$ approaches the breakdown value $E_b$, the source of magnetic field is turned on to provide a compensational inductive electric field $E_{ind}$. The inductive field $E_{ind}$ is directed opposite to $E_{ch}$ to compensate the charge-induced electric field.

Discharging: The discharging of the capacitor is synchronized with the change of the magnetic field rate. The effective magnetic field is kept close to $E_b$ till the last electron is discharged. These three regimes are illustrated in FIG. 2.

The energy released during the discharging is $$W_{max} = \int_0^{q_{max}} V dq = \int_0^{q_{max}} V_b dq = V_b q_{max} = CV_b^2 + C(V_{ind}V_b) \quad (7)$$

where $V_{ind}$ is the maximum inductive voltage produced by the time varying magnetic field. Comparing Eq. (1) and Eq. (7), one can see the fundamental difference. The maximum energy stored in the capacitor is no longer limited by the amount of charge stored but depends on the level of the compensational inductive voltage.

In theory, there is no limit on the energy stored in a single capacitor using the compensational method. In practice, the maximum energy and the storage time are limited by the capabilities of the magnetic field source. It may be problematic to keep constant rate of the magnetic field change $\partial B/\partial t$ to provide sufficiently strong compensational inductive electric field Eind for a long time. As a possible solution to this challenge, we propose an oscillatory circuit where the charge on the plates of the capacitor and the external magnetic field oscillate in time. The oscillation of the charge and the magnetic field are synchronized to keep the effective electric field below the breakdown. For example, the charge on the plate changes as $$q = q_{max} \cdot \sin(\omega t), \quad (8)$$

where $\omega$ is the frequency of oscillation. The external magnetic field changes as $$B = B_{max} \cdot \cos(\omega t). \quad (9)$$

Figure 3:
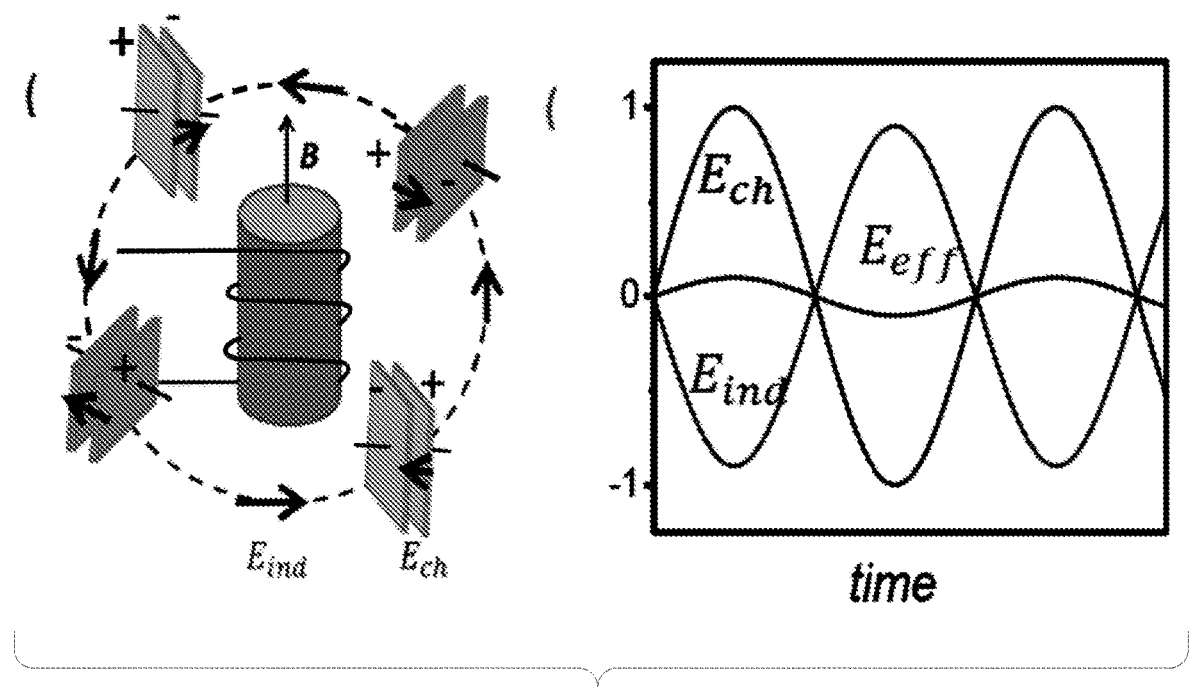
FIG. 3: (A) Schematics of an oscillatory circuit using the compensational method for energy storage. It consists from a set of capacitors and a source of magnetic field. The charge on the capacitor plates and magnetic field produced by the source oscillate in time. The inductive electric field $E_{ind}$ produced by the time varying magnetic field compensates the electric field produced by charges $E_{ch}$. (B) Results of numerical modeling illustrating the change in time of $E_{ch}$ and $E_{ind}$. These two fields oscillate out of phase.

In this case, $E_{ch}$ and $E_{ind}$ are oscillating out of phase. The magnitude of the inductive electric field is adjusted to satisfy Eq. (6). This operation is illustrated in FIG. 3. The oscillation implies that the energy stored in the capacitor will be transferred to another capacitor or converted magnetic field. It is interesting to note that there is no "breakdown magnetic field". There is no limit to a maximum value of a magnetic field as there are no magnetic charges which can be discharged.

In order to release the energy stored, the compensational inductive field is reduced to keep $E^{eff} \leq E_b$.

There may be other solutions (e.g., electro-magnetic circuits, charging/discharging procedures, approaches to the inductive electric field generation, etc.) We believe that this invention will stimulate a lot of activities in the area of electro-magnetic energy storage.

Figure 4:
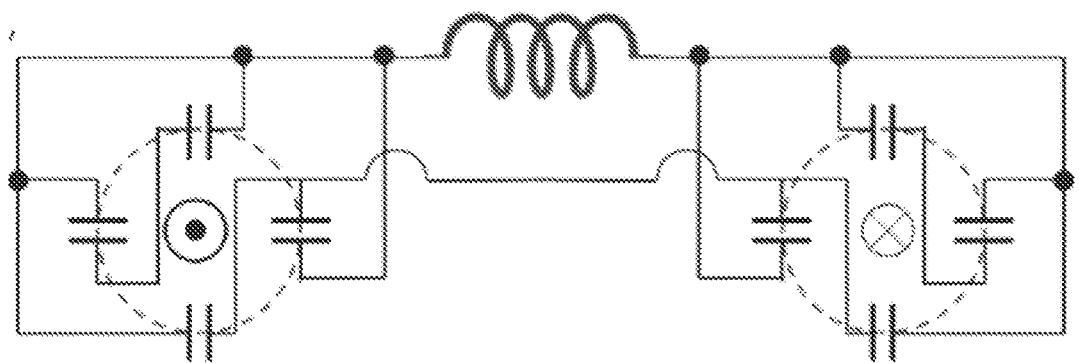
FIG. 4: Schematics of a complementary electro-magnetic circuit which combines two oscillatory circuits as shown in FIG. 3(A). The circuits oscillate out-of-phase. While one of the circuits is discharging, it provides energy to the magnetic source (e.g. coil) of the second contour which is charging.
Figure 5:
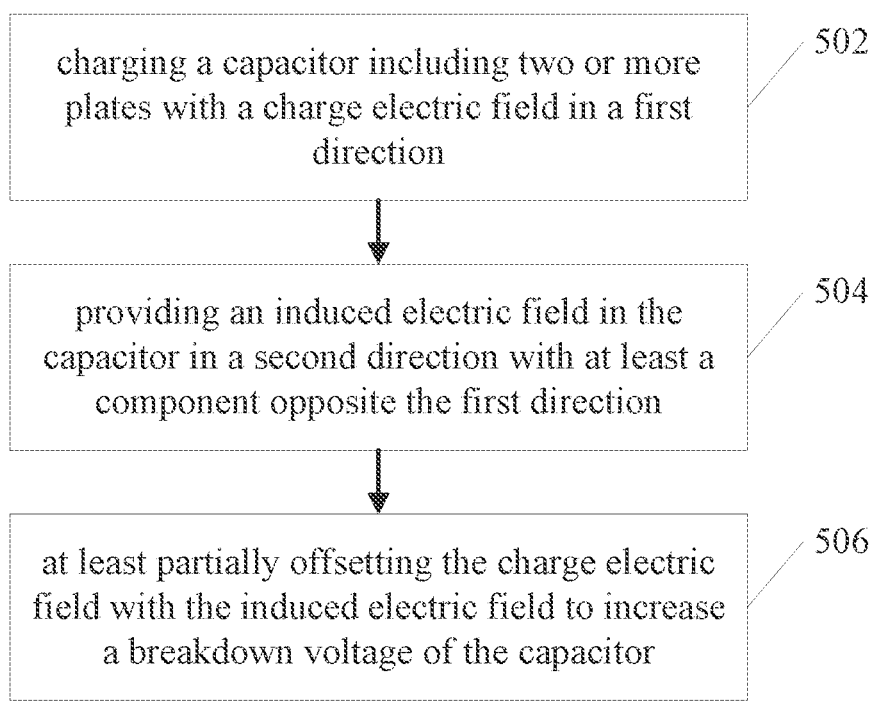
FIG. 5 shows an example method of operating an energy storage device according to one embodiment.

SUMMARY (i) Utilization of the inductive electric field in addition to electric field produced by charges for energy density enhancement in capacitors and other electro-magnetic devices (ii) Compensational method of using the inductive electric filed to compensate the field produced by charges for increasing the amount of charge stored in capacitors (iii) Using inductive voltage during capacitor (or other electric device) charging/discharging to increase or speed up energy pumping/release (iv) Oscillatory circuits using the compensational method for energy storage (v) Complements electro-magnetic circuits (example is shown in FIG. 4) for energy storage To better illustrate the method and apparatuses disclosed herein, a non-limiting list of embodiments is provided here:

Example 1 includes an energy storage device. The energy storage device includes a capacitor including two or more plates, the capacitor configured to store a charge electric field in a first direction, and an inductor circuit adjacent to the capacitor, configured to provide an induced electric field in the capacitor in a second direction with at least a component opposite the first direction. When in operation, the induced electric field at least partially compensates for the charge electric field and increases a breakdown voltage of the capacitor.

Example 2 includes the energy storage device of example 1, wherein the inductor circuit is configured to vary the induced electric field over time.

Example 3 includes the energy storage device of any one of examples 1-2, wherein the charge electric field and the induced electric field both oscillate.

Example 4 includes the energy storage device of any one of examples 1-3, wherein the charge electric field and the induced electric field oscillate at 180 degrees out of phase.

Example 5 includes an energy storage device. The energy storage device includes a first capacitor including two or more plates, the first capacitor configured to store a first charge electric field in a first direction, and a first inductor circuit adjacent to the first capacitor, configured to provide a first induced electric field in the first capacitor in a direction with at least a component opposite the first direction. The energy storage device includes a second capacitor including two or more plates, the second capacitor configured to store a second charge electric field in a second direction, and a second inductor circuit adjacent to the second capacitor, configured to provide a second induced electric field in the second capacitor in a direction with at least a component opposite the second direction. The first inductor circuit and the second inductor circuit are coupled together, and wherein the first induced electric field and the second induced electric field both oscillate out of phase with one another to exchange energy back and forth between the inductor circuits.

Example 6 is a method, including charging a capacitor including two or more plates with a charge electric field in a first direction, providing an induced electric field in the capacitor in a second direction with at least a component opposite the first direction, and at least partially offsetting the charge electric field with the induced electric field to increase the amount of charge stored before breakdown.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may he used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise firms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. An energy storage device, comprising:
   a capacitor including two or more plates, the capacitor configured to store a charge electric field in a first direction;
   an inductor circuit adjacent to the capacitor, configured to provide an induced electric field in the capacitor in a second direction with at least a component opposite the first direction;
   wherein when in operation, the induced electric field at least partially compensates for the charge electric field and increases a breakdown voltage of the capacitor.

2. The energy storage device of claim 1, wherein the inductor circuit is configured to vary the induced electric field over time.

3. The energy storage device of claim 1, wherein the charge electric field and the induced electric field both oscillate.

4. The energy storage device of claim 3, wherein the charge electric field and the induced electric field oscillate at 180 degrees out of phase.

5. An energy storage device, comprising:
   a first capacitor including two or more plates, the first capacitor configured to store a first charge electric field in a first direction;
   a first inductor circuit adjacent to the first capacitor, configured to provide a first induced electric field in the first capacitor in a direction with at least a component opposite the first direction;
   a second capacitor including two or more plates, the second capacitor configured to store a second charge electric field in a second direction;
   a second inductor circuit adjacent to the second capacitor, configured to provide a second induced electric field in the second capacitor in a direction with at least a component opposite the second direction;
   wherein the first inductor circuit and the second inductor circuit are coupled together, and wherein the first induced electric field and the second induced electric field both oscillate out of phase with one another to exchange energy back and forth between the inductor circuits.

6. A method, comprising:
   charging a capacitor including two or more plates with a charge electric field in a first direction;
   providing an induced electric field in the capacitor in a second direction with at least a component opposite the first direction;
   at least partially offsetting the charge electric field with the induced electric field to increase the amount of charge stored before breakdown.

* * * * *